(No Model.)

G. B. GODDARD.
HANDLE FOR BICYCLES.

No. 499,103. Patented June 6, 1893.

Witnesses.
George Berry,
James T. Murray

Inventor.
Geo. B. Goddard.
by N. C. Lombard
Attorney.

UNITED STATES PATENT OFFICE.

GEORGE B. GODDARD, OF BROCKTON, MASSACHUSETTS.

HANDLE FOR BICYCLES.

SPECIFICATION forming part of Letters Patent No. 499,103, dated June 6, 1893.

Application filed September 15, 1892. Serial No. 446,035. (No model.)

*To all whom it may concern:*

Be it known that I, GEORGE B. GODDARD, of Brockton, in the county of Plymouth and State of Massachusetts, have invented a new and useful Handle for Bicycles, of which the following, taken in connection with the accompanying drawings, is a specification.

My invention relates to handles for bicycles and it consists in certain novel features of construction, arrangement and combination of parts which will be readily understood by reference to the description of the drawings and to the claim hereinafter contained and in which my invention is clearly pointed out.

Figure 1:
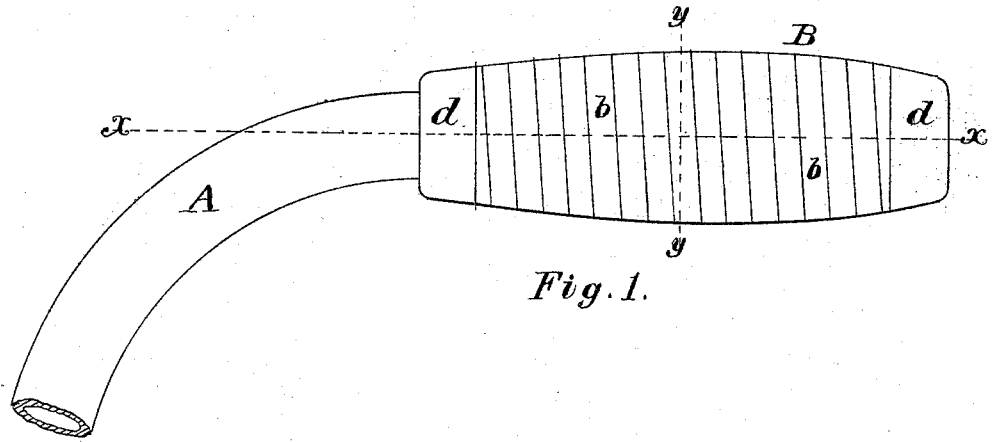
Figure 2:
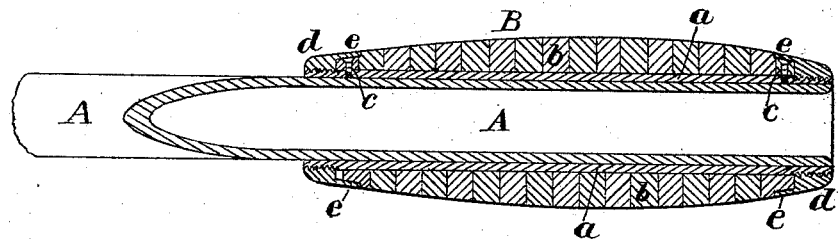
Figure 3:
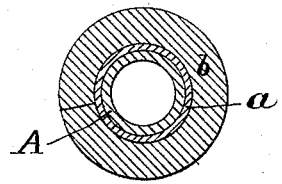

Figure 1 of the drawings is a plan of a portion of one arm of a bicycle steering-bar with my invention applied thereto. Fig. 2 is a longitudinal section on line $x\, x$ on Fig. 1. Fig. 3 is a transverse section on line $y.\, y.$ on Fig. 1.

In the drawings A is a portion of the steering bar or lever made in the form of a tube and B is my improved handle composed of the sleeve $a$ provided with a male screw thread on each end thereof, the strip of leather or other non-metallic and flexible and absorbent material $b$ wound spirally around said sleeve and having its two ends secured to said sleeve by means of the screws or rivets $c$, the several convolutions of said strip of material being preferably secured together by cement so as to form a tube or sleeve; and the nuts $d\, d$ screwed upon the threaded ends of the sleeve $a$ and each having its inner face chambered so as to form an annular lip $e$ which overlaps or incloses the end portions of the spirally wound covering $b$ and the screws or rivets $c$ by which said covering material is secured in position. The handle B is secured to the steering bar by a driving fit or in any other well known manner. This makes a very durable handle that is light and not liable to be easily injured or disfigured, and that can be produced at a comparatively small cost.

I claim—

A handle for bicycles and other purposes composed of a metallic tube having a portion of each end thereof exteriorly threaded a sleeve of non-metallic and absorbent material formed by winding a strip of said material spirally around said tube, the ends of said strip being secured by screws or rivets to said tube, and a nut fitted to each end of said tube and each provided on its inner face with an annular lip, cylindrical or nearly so in form, with its edge in a plane at right angles to its axis, and arranged to inclose a portion of each end of said non-metallic sleeve substantially as described.

In testimony whereof I have signed my name to this specification, in the presence of two subscribing witnesses, on this 6th day of September, A. D. 1892.

GEORGE B. GODDARD.

Witnesses:
   N. C. LOMBARD,
   GEORGE PERRY.